(12) United States Patent
Rumler

(10) Patent No.: US 11,498,460 B1
(45) Date of Patent: Nov. 15, 2022

(54) CHILD CARRIER RESTRAINT

(71) Applicant: E.V.S. Ltd., South Bend, IN (US)

(72) Inventor: Thomas Rumler, Dowagiac, MI (US)

(73) Assignee: E.V.S Ltd., South Bend, IN (US)

( * ) Notice: Subject to any disclaimer, the term of this patent is extended or adjusted under 35 U.S.C. 154(b) by 0 days.

(21) Appl. No.: 17/313,208

(22) Filed: May 6, 2021

(51) Int. Cl.
*B60N 2/28* (2006.01)
*B60R 22/20* (2006.01)

(52) U.S. Cl.
CPC ............ *B60N 2/2812* (2013.01); *B60R 22/20* (2013.01); *B60N 2002/2815* (2013.01)

(58) Field of Classification Search
CPC ....... B60R 22/20; B60R 22/10; B60N 2/2812; B60N 2002/2815
See application file for complete search history.

(56) References Cited

U.S. PATENT DOCUMENTS

| | | | | |
|---|---|---|---|---|
| 3,834,758 A * | 9/1974 | Soule | .................... | B60R 22/105 |
| | | | | 24/579.11 |
| 3,954,280 A * | 5/1976 | Roberts | ................. | B60R 22/105 |
| | | | | 280/808 |
| 3,994,513 A * | 11/1976 | Courtis | ................... | B60R 22/18 |
| | | | | 280/808 |
| 4,973,083 A * | 11/1990 | Richards | ................. | B60R 22/26 |
| | | | | 297/483 |
| 6,676,219 B1 * | 1/2004 | Brewer | ................. | B60R 22/023 |
| | | | | 297/483 |
| 9,192,248 B2 * | 11/2015 | Wigzell | ................ | B60R 22/105 |
| 10,259,357 B2 * | 4/2019 | Dingman | ............... | B60N 2/286 |
| 2007/0001495 A1 * | 1/2007 | Boyle | .................. | B60N 2/2806 |
| | | | | 297/484 |
| 2013/0187421 A1 * | 7/2013 | Foye | .................... | B60N 2/2812 |
| | | | | 297/232 |
| 2019/0232827 A1 * | 8/2019 | Maciejczyk | ......... | B60N 2/2809 |

* cited by examiner

*Primary Examiner* — Philip F Gabler
(74) *Attorney, Agent, or Firm* — Crump Law P.C.

(57) ABSTRACT

A child carrier restraint that allows the upper ends of the shoulder straps to be adjustably positioned to properly secure children having varying torso lengths within the child carrier. The child restraint includes a traditional five point belt harness and pair of shoulder belt location adjusters, which allows the shoulder strap to be selectively positioned over and behind the child regardless of the length of the child's torso. The shoulder location adjusters are mounted to the back of the child carrier and includes a strap loop trained about a locking slide and a bottom strap loop anchor. The end of the shoulder strap is sewn directly to the strap loop. The locking slide can be manually disengaged to allow the strap loop to slide freely, thereby selectively positioning the end of the shoulder strap along the back of the child carrier.

18 Claims, 12 Drawing Sheets

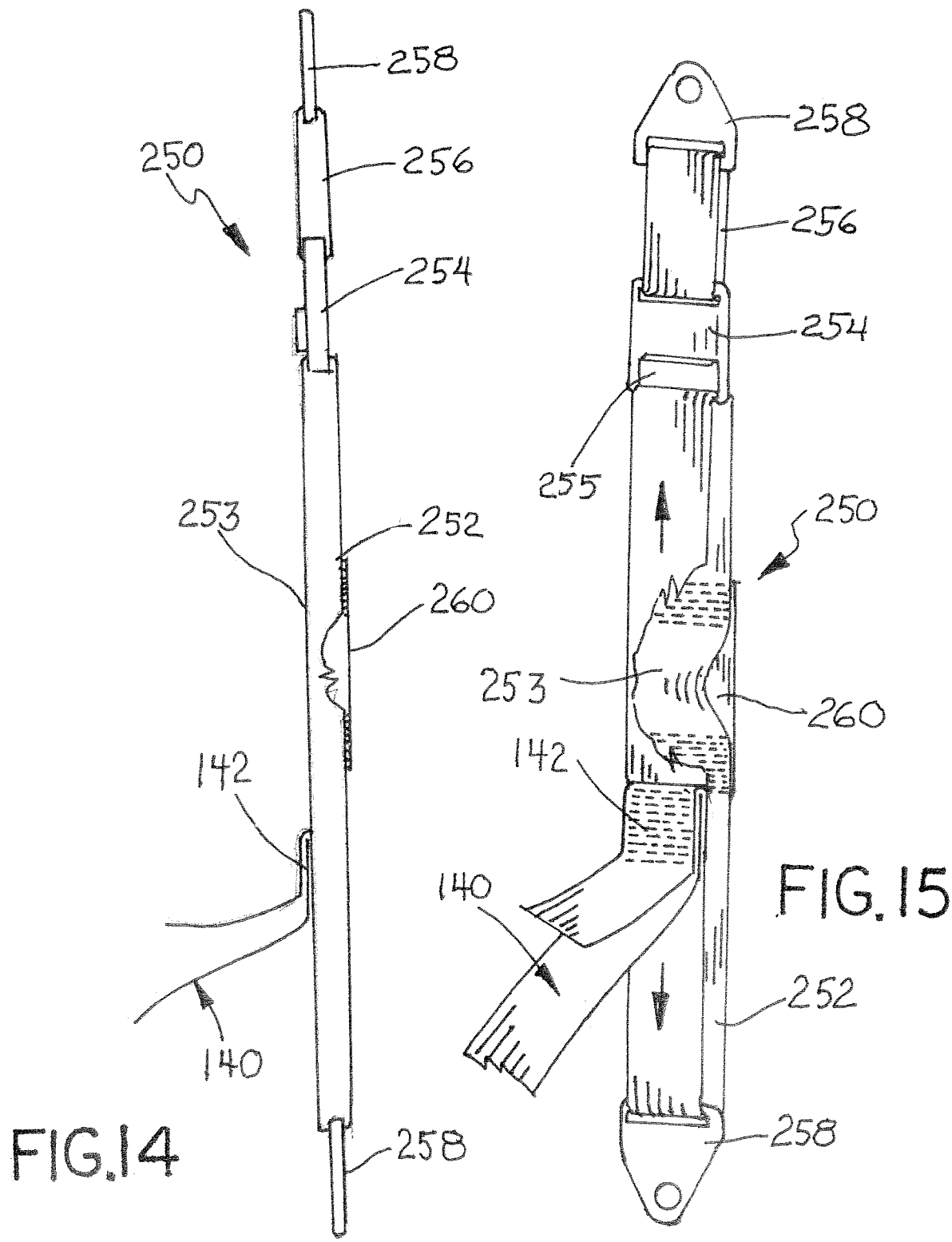

CHILD CARRIER RESTRAINT

This invention relates to child safety restraints for use in child carriers, such as child car seats.

BACKGROUND OF THE INVENTION

Child carriers are designed for safely transporting children. Child carriers include portable car seats designed specifically for transporting children in vehicles, but also include carriers adapted for other purposes, such as strollers and high chairs. Generally, child carriers include belt restraints to safely secure the child to the carrier. The child carrier restraints typically consist of shoulder and lap belts with quick connect buckles and strap adjustment slides. While most child carriers have been designed to accommodate children of various ages or sizes, conventional child carrier restraints, heretofore, have not properly accommodated for children of varying torso lengths, regardless of weight or age. To properly secure a child within a carrier, the shoulder strap should extend over and behind the child's shoulder and affix to the carrier back at a point at the same approximate height as the top of the child's shoulder. The lap and shoulder straps of conventional child restraints in child carriers can be loosened and tightened around the child, but have not provided any adjustment to the connection point of the shoulder strap at the back of the carrier to accommodate varying torso lengths. In conventional child carrier restraints, the connection point of the shoulder straps often rides above the top of the child's shoulder for younger children or children with shorter torsos. If the shoulder strap does not ride over the top of the child's shoulder and connect to the seat back directly behind the child's shoulder, the child is not adequately secured in the carrier and can potentially slide out of the restraint.

SUMMARY OF THE INVENTION

The child carrier restraint of this invention allows the upper ends of the shoulder straps to be adjustably positioned to properly secure children having varying torso lengths within the child carrier. The child restraint includes a traditional five point belt harness and pair of shoulder belt location adjusters, which allows the shoulder strap to be selectively positioned over and behind the child regardless of the length of the child's torso. The shoulder location adjusters are mounted to the back of the child carrier and include a strap loop trained about a locking slide and a bottom strap loop anchor. The end of the shoulder strap is sewn directly to the strap loop. The locking slide can be manually disengaged to allow the strap loop to slide freely, thereby selectively positioning the end of the shoulder strap along the back of the child carrier.

The child carrier restraint of this invention provides a more secure safety belting system than conventional restraints. The child carrier restraint can be adapted for use with a variety of child carriers, including but not limited to, strollers, child seats, vehicle seating and chairs, within the teachings of the invention. The shoulder location adjusters allow for the proper positioning of the shoulder straps over and behind the child regardless of the length of the child's torso. Properly positioning the shoulder straps over and behind the child's shoulder more precisely fits and tightens the restraint around the child, thereby enhancing child safety. The use of locking slides on the shoulder location adjusters allows the child restraint to be readily adjusted and the child safely and securely place placed and belted into the child carrier.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which:

FIG. 14 is a side view of an alternative exemplary embodiment of the shoulder location adjusters of the child restraint of this invention; and FIG. 15 is a perspective view of one of the shoulder location adjusters of FIG. 14

DESCRIPTION OF THE PREFERRED EMBODIMENT

Figure 1:
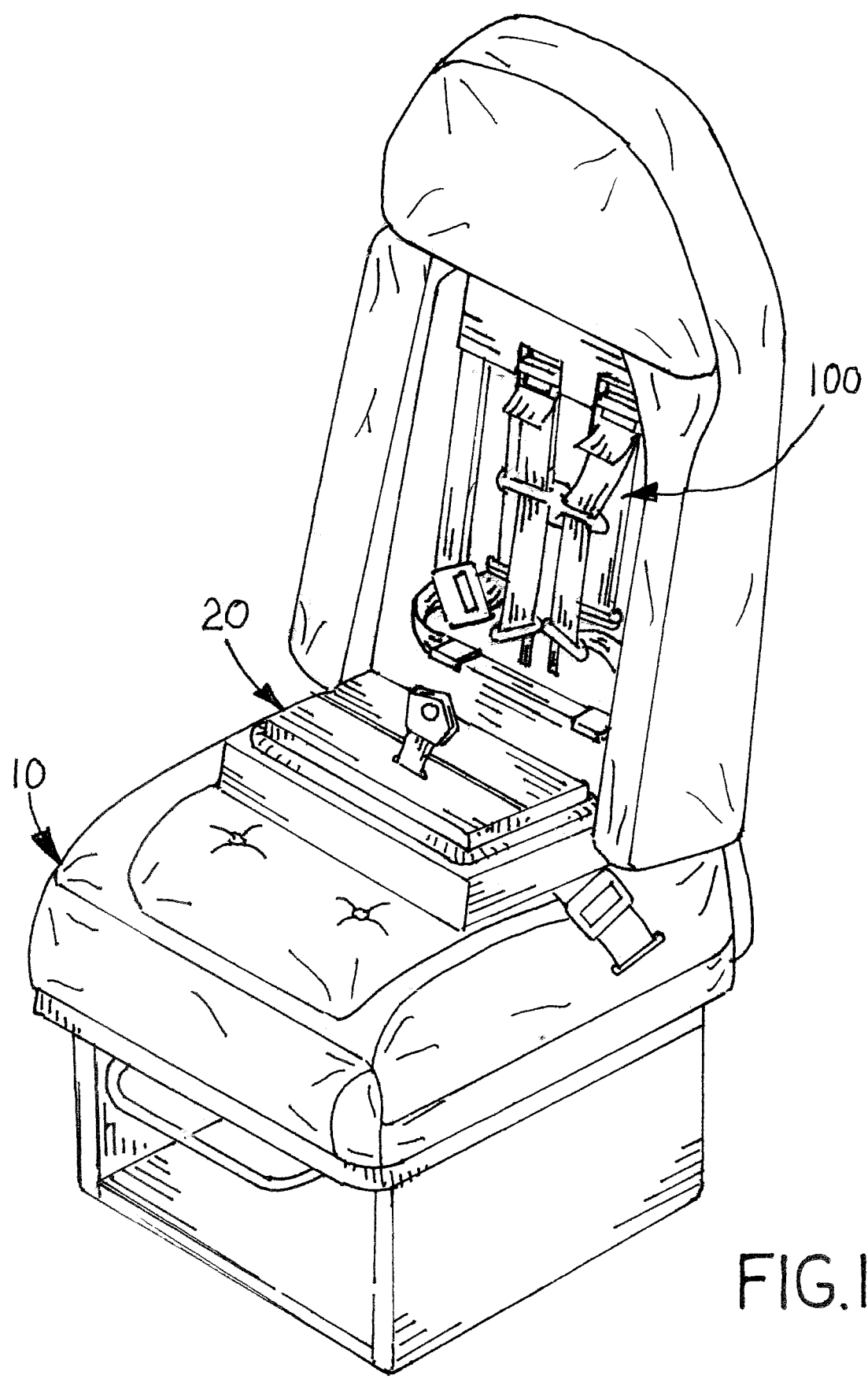
FIG. 1 is a perspective view of a vehicle seat using an exemplary embodiment of the child restraint of the invention in a child carrier.
Figure 2:
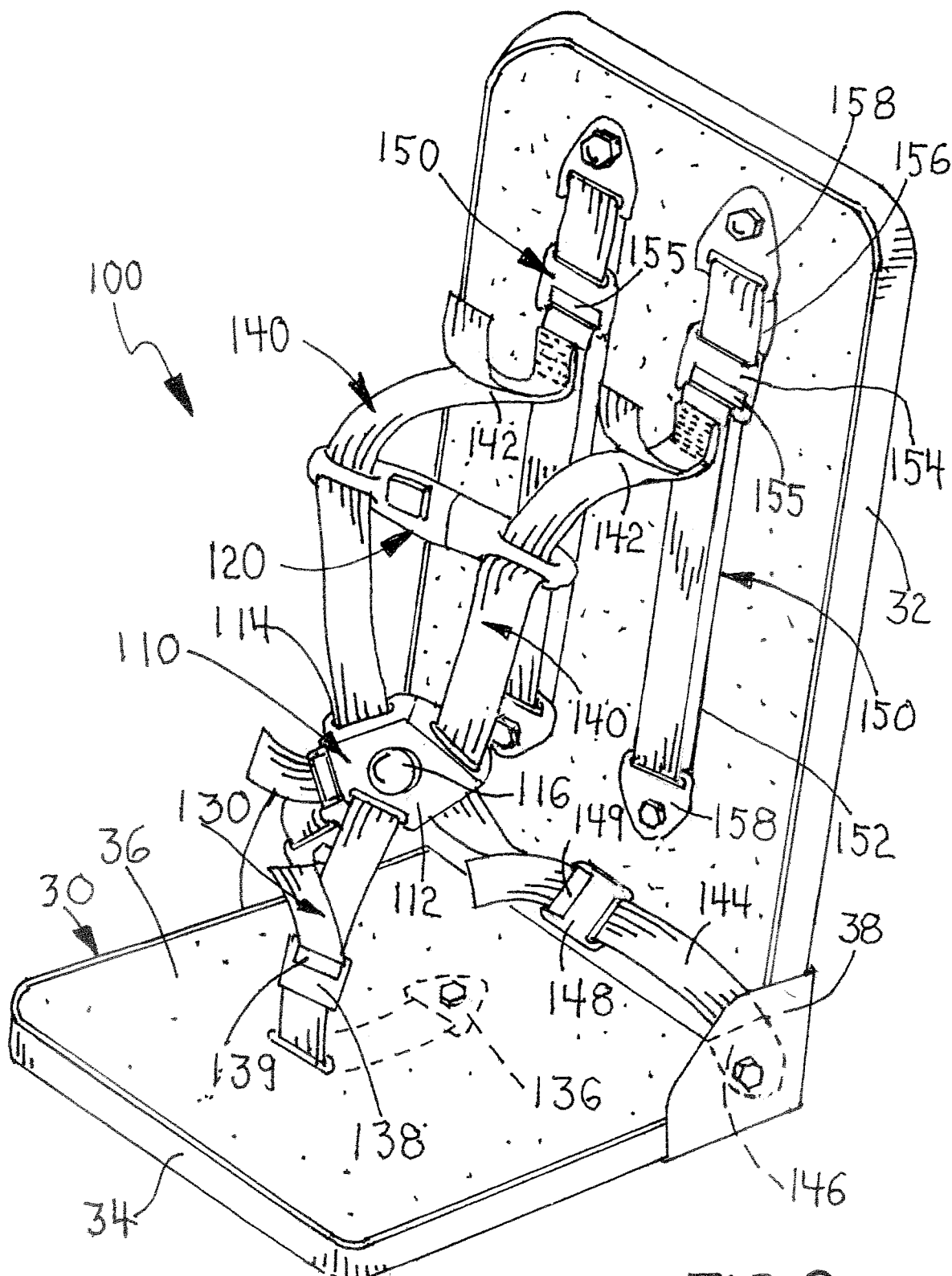
FIG. 2 is a perspective view of the child carrier and child restraint of FIG. 1.
Figure 3:
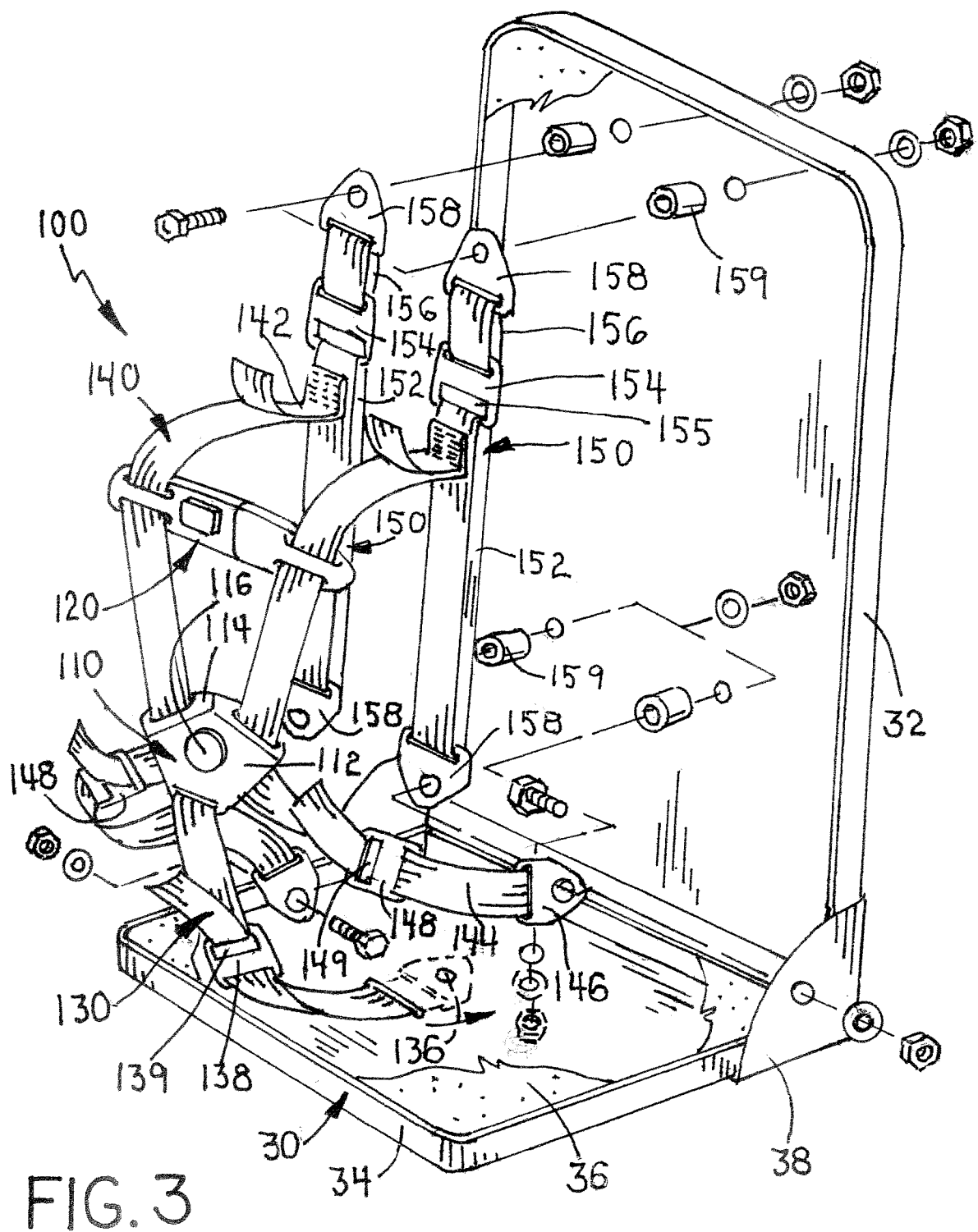
FIG. 3 is an exploded view of the child carrier and child restraint of FIG. 1.
Figure 4:
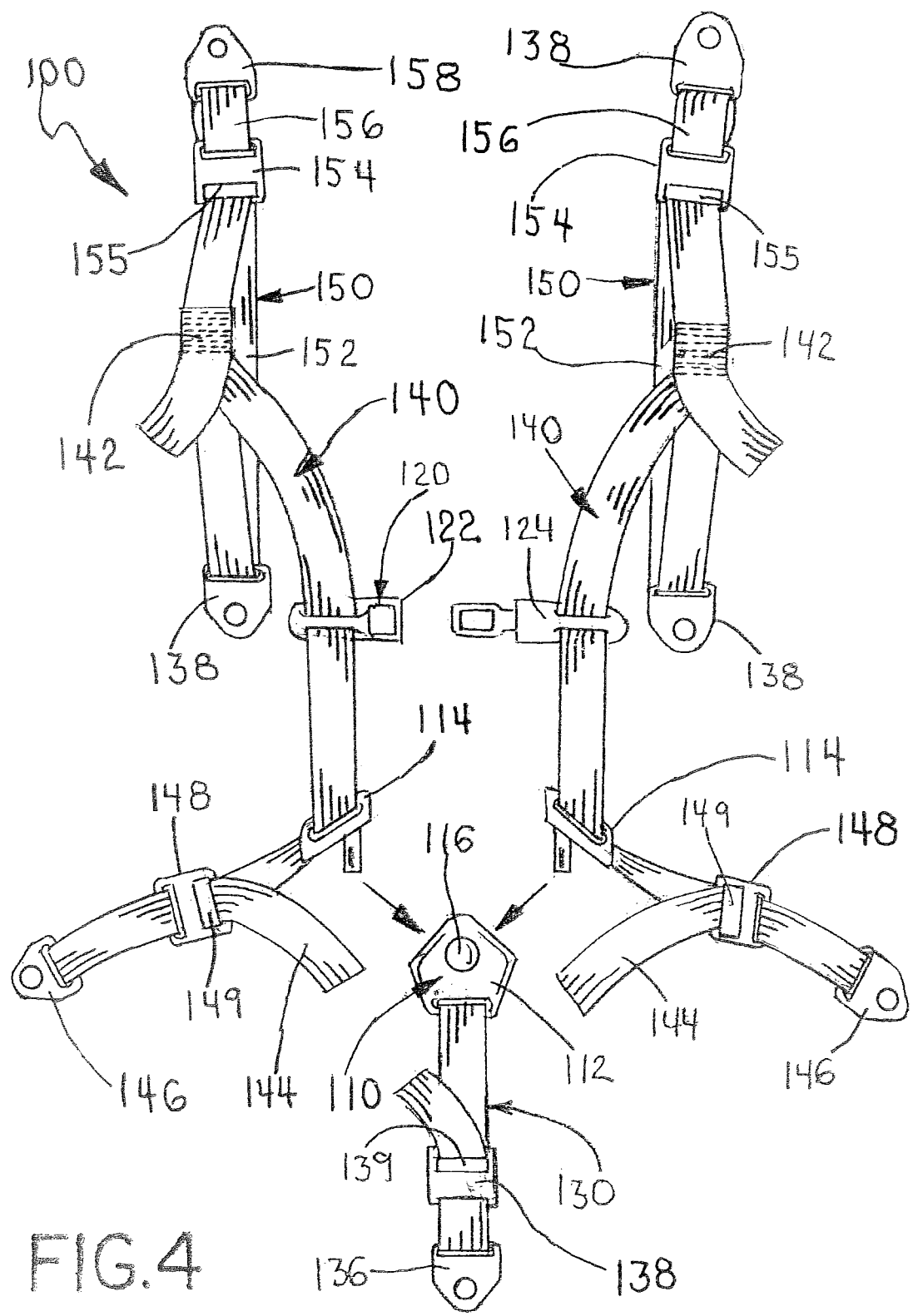
FIG. 4 is a front view of the child restraint of FIG. 1.
Figure 5:
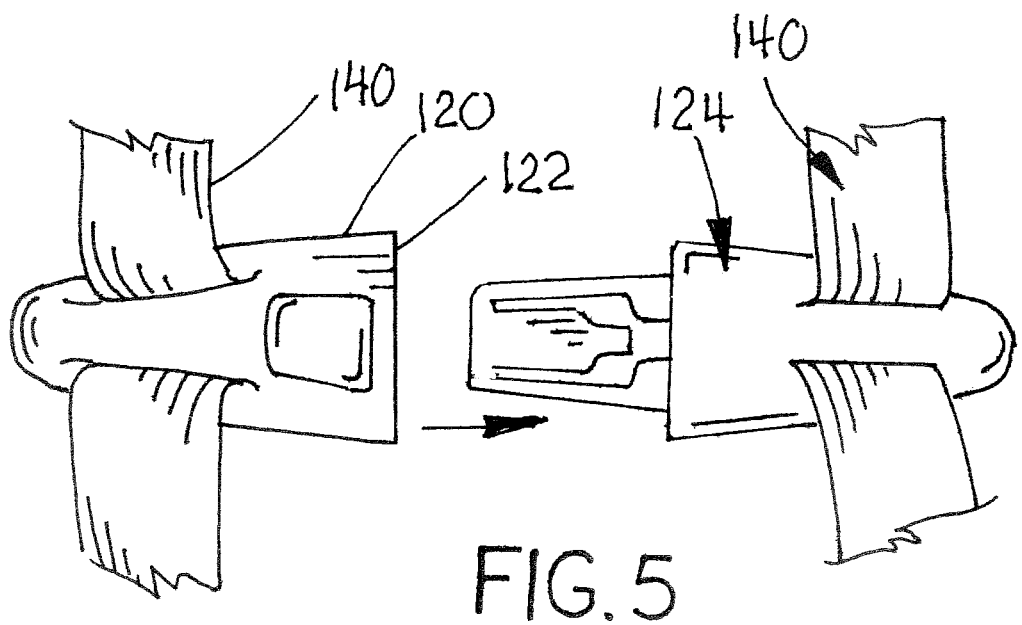
FIG. 5 is a partial front view of the sternum buckle of the child restraint of FIG. 1.
Figure 6:
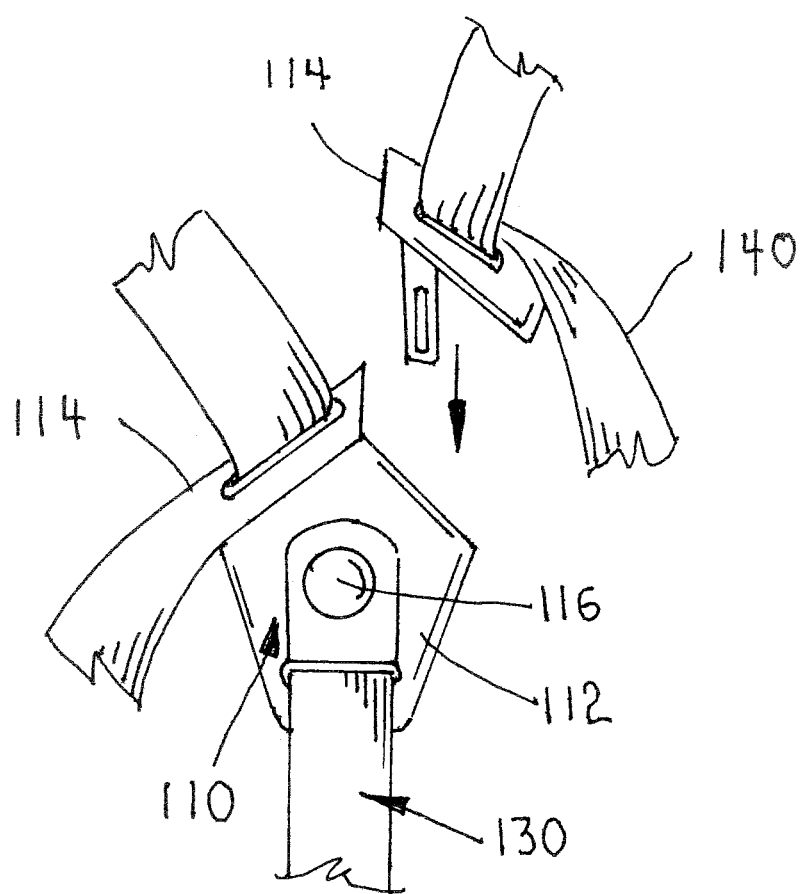
FIG. 6 is a partial front view of the center buckle of the child restraint of FIG. 1.
Figure 7:
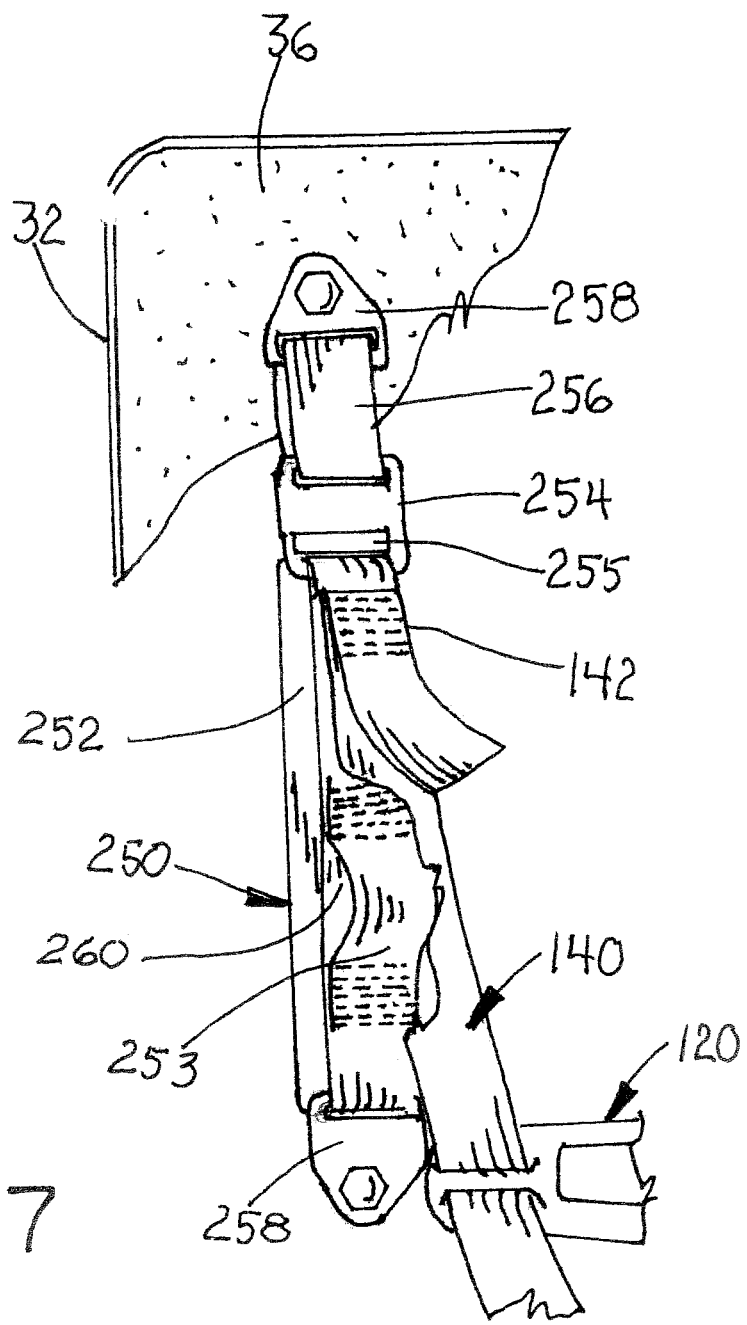
FIG. 7 is a partial front view of one of the shoulder location adjusters of the child restraint of FIG. 1.
Figures 8, 9:
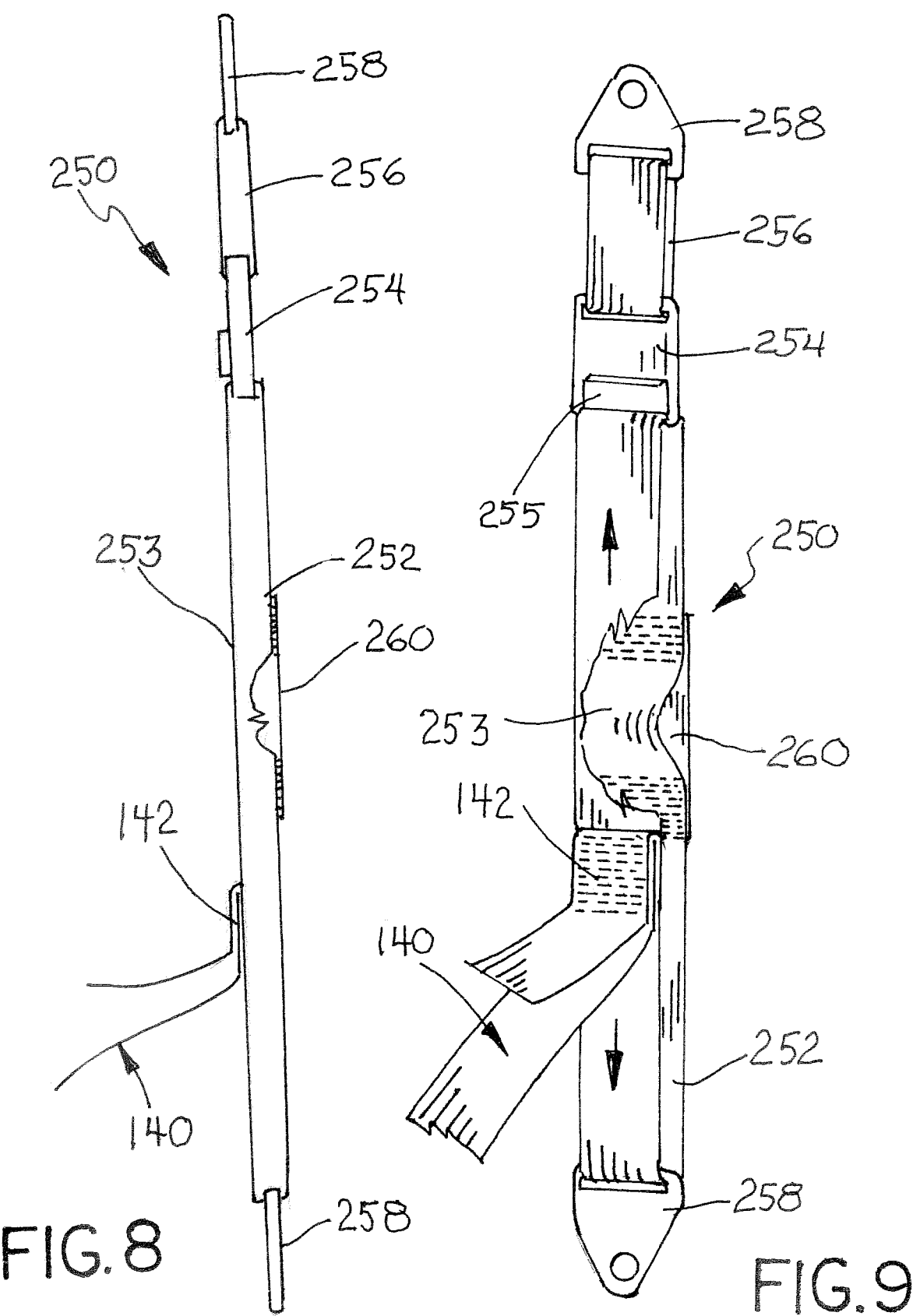
FIG. 8 is a side view of one of the shoulder location adjusters of the child restraint of FIG. 1.
FIG. 9 is a perspective view of one of the shoulder location adjusters of the child restraint of FIG. 1.
Figure 10:
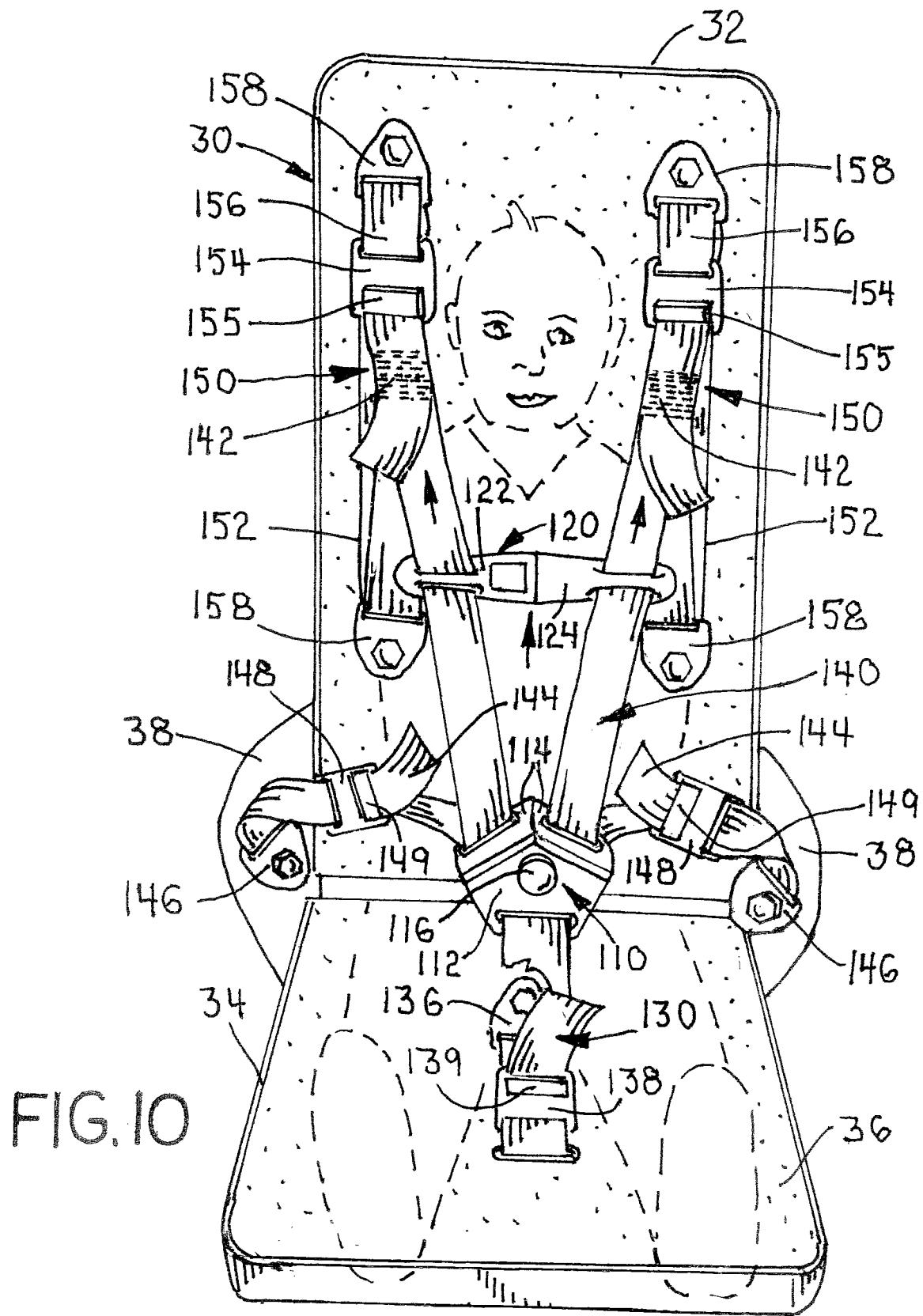
FIG. 10 is a front view of a toddler seated on the child carrier and secured by the child restraint of FIG. 1.
Figure 11:
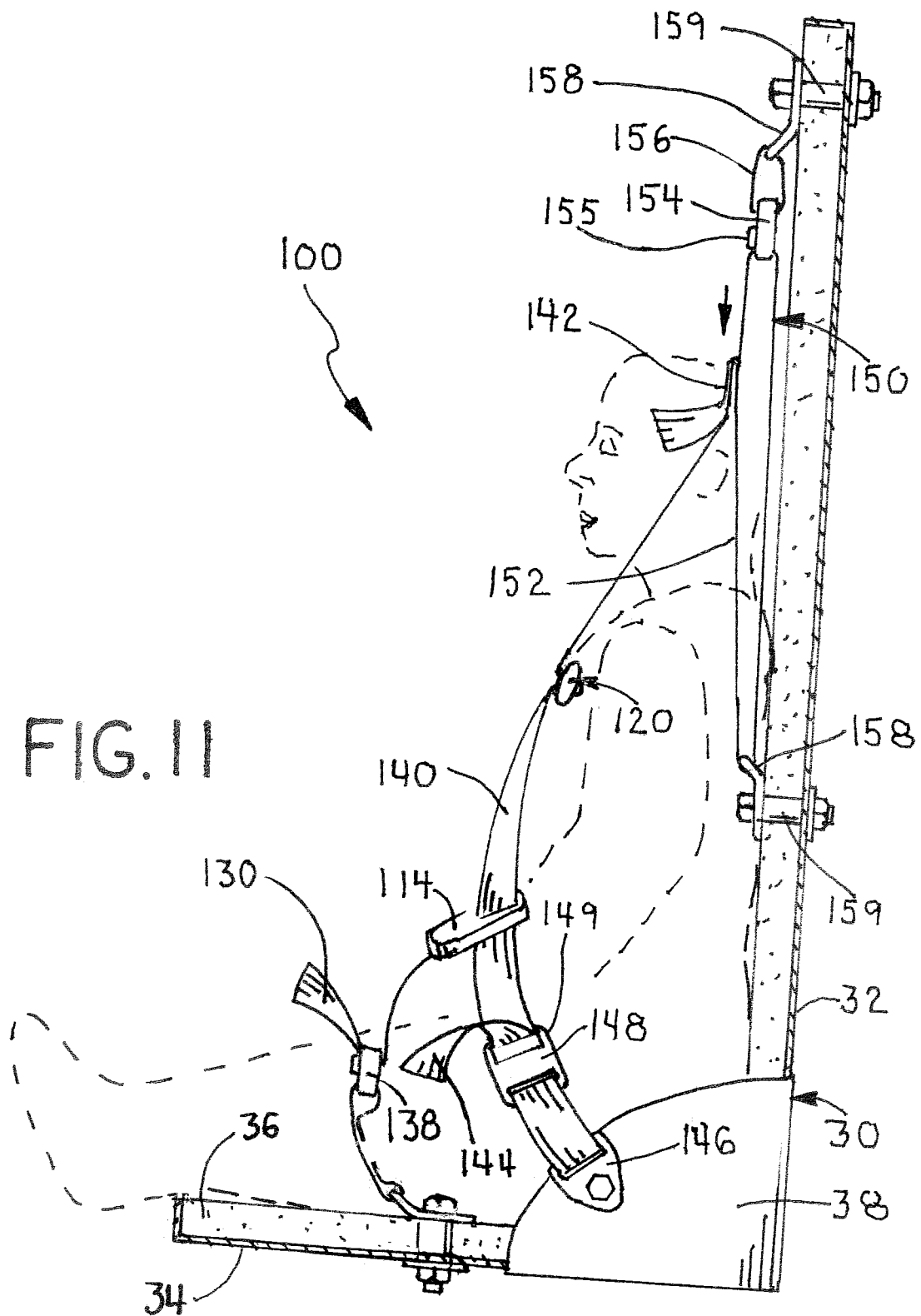
FIG. 11 is a side view of a toddler seated on the child carrier and secured by the child restraint of FIG. 1.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Referring now to the drawings, FIGS. 1-13 illustrate an exemplary embodiment of a child carrier restraints of this invention, which is designated generally as reference numeral 100. The child carrier restraint of this invention allows the upper ends of the shoulder straps to be adjustably positioned to properly secure children having varying torso lengths within the child carrier. The child carrier restraint can be adapted for use with a variety of child carriers, including but not limited to, strollers, child seats, vehicle seating and chairs, within the teachings of the invention. For illustrative purposes, child restraint system 100 is illustrated as an independent belting systems of an emergency vehicle seat 10 having an integral child carrier 20.

As shown, vehicle seat 10 is of the type available from EVS of South Bend, Ind. Vehicle seat 10 supports adult passengers and child carrier 20 deploys from within the seat body to safely transport toddlers and infants. Child carrier 20 is designed and intended to support and carry an infant or toddler generally under the weight of 65 lbs. Child carrier 20 includes a folding seat/cradle 30 that shiftably deploys from a seat back frame 12 and unfolds into a convenient child seat or infant cradle. Seat/cradle 30 is shiftably mounted to the sub-frame (not shown) within the seat back 12 to allow the seat/cradle to deploy from an interior compartment within seat back 12 to either a reclined infant position or an upright toddler position. In addition, seat/cradle 30 also expands between folded and unfolded positions. Seat/cradle 30 includes a back panel 32 and a seat panel 34. Seat/cradle 30 is covered by a removable padded liner or covering 36 that encloses any exposed surfaces of the cradle, but also moves and folds with the cradle.

Child restraint 100 is separate and independent from the adult safety restraint belts (not fully shown) of seat 10 and stows with child carrier 20 inside the collapsed seat/cradle 30 when not in use, but is readily available once seat/cradle 30 is deployed and unfolded. Child restraint 100 is an assembly of conventional nylon webbing or strapping, polymer quick release buckles and slides and metal anchors and fasteners of the type generally used in child restraint systems and well known in the art. As shown, child restraint 100 consists of a conventional "five point" safety harness and a pair of shoulder location adjusters 150. The safety harness generally consists of a central three point connector buckle 110, a sternum buckle 120, a center "crotch strap 130, a pair of side strap 140.

Center connector buckle 110 and sternum buckle 120 are conventional quick release buckles of the type commonly used in child carriers. Center buckle 110 includes a center body 112 and a pair of detachable side connectors 114. Center buckle 110 also has a central button 116 that releases side connectors 114 to interconnect side straps 140 to crotch belt 130. Sternum buckle 120 has left and right halves that interconnect to draw side straps over the child torso.

Crotch strap 130 is a single length of nylon webbing having a buckle end permanently fixed to connector buckle 110 and an adjustment end mounted to the bottom of seat panel 34 by a metal anchor 136. Anchor 136 is bolted to the bottom of seat panel 34 and has a slot through which crotch strap 130 passes. The adjust end of crotch strap 130 extends through aligned slots in seat panel 34 and seat pad 36 and passes through anchor 136. Crotch strap 130 also includes a slide 138 to properly position center buckle 110 and adjust the overall length of crotch belt. Slide 138 is typically a locking slide having a push button release for readily adjusting the length of crotch strap 130.

Each side strap 140 is a single length of nylon webbing having a shoulder end 142 permanently fixed to the shoulder location adjusters 150 and a lap end 144 adjustably affixed to cradle/seat 30. Each side strap 140 passes through slots in side connectors 124, which divides the side strap into a shoulder belt section and a lap belt section. Each side strap 110 also passes through slots in each half of sternum buckle 134. Lap end 144 of each side strap 140 is mounted to the hinge plate 36 of cradle/seat 30 by a metal anchor 146. Each side strap 140 also includes a slide 148 to further properly position center buckle 110 and adjust the overall length of the side strap. Slide 148 is typically a locking slide having a push button release for readily adjusting the length of the side belt 140.

Shoulder location adjusters 150 allow shoulder strap sections to be selectively positioned over and behind the child regardless of the length of the child's torso. Shoulder location adjusters 150 are mounted to the back panel 32 and lie flat against covering 36 of back panel 34. Each shoulder location adjuster 150 includes a strap loop 152, a locking slide 154 and a short extension strap 156 and a pair of strap anchors 158. Strap anchors 140 are bolted to back panel 32 on spacers (not shown) that extend through covering 36. Strap loop 152 is a length of nylon webbing connected end to end. Similarly, extension strap 156 is a shorter length of nylon webbing connected end to end. Extension strap 156 connects slide 154 to the top strap anchor 158. Strap loops 152 are movably trained between the bottom strap anchors 158 and slides 154 so that the strap loops move there between in a conveyer-like fashion. Shoulder end 142 is sewn or bonded to the outer run of strap loop 152 and moves with the strap loop between the bottom anchor 158 and slide 154. Slide 154 is again a locking type slide for securely holding strap loop 152 in position and prevent in the strap loop for sliding about the bottom strap anchor and slide. Locking slide 154 can be manually disengaged by depressing release button 155 to allow the strap loop to slide freely, thereby selectively positioning the end of the shoulder strap along the back of the child carrier. Deactivating releasing button 155 locks strap loop 152 in place holding the relative location of shoulder end 142 in place. It should be noted that shoulder location adjusters 150 are dimensioned and secured to back panel 32 so that strap loops 152 are taunt and the tension on the strap helps reduce slack and play with the shoulder strap sections. Moreover, while taunt in actual practice, the figures illustrate strap loops 152 having a significantly greater degree of slack solely to more clearly visualize the operation of shoulder location adjusters 150.

FIGS. 14-15 illustrate an alternative embodiment of the shoulder location adjuster of this invention, which is designated generally as reference numeral 250. Shoulder location adjuster 250 is similar in design, construction and function, as shoulder location adjuster 150, including strap loops 252, locking slides 254 having a release button 255, extension strap 256 and a pair of strap anchors 258. Shoulder location adjuster 250 differs in the addition of an elastic loop tensioner 260 to keep strap loop 252 taut between the bottom anchor 258 and locking slide 254. As shown, loop tensioner 260 is an elongated length of elastic webbing. The ends of loop tensioner 260 are sewn to strap loop 252 to form a small gather 253 of webbing, which helps keep the strap loop taut. Tensioner 260 helps accommodate for manufacturing and installation deviations in the dimensions of shoulder location adjuster 250 and seat/cradle 30. In other alternative embodiments, the shoulder location adjusters may employ other forms of loop tensioners, which assist in keeping the strap loops taut and account for dimensional deviation and play in the loop connections.

Figure 12:
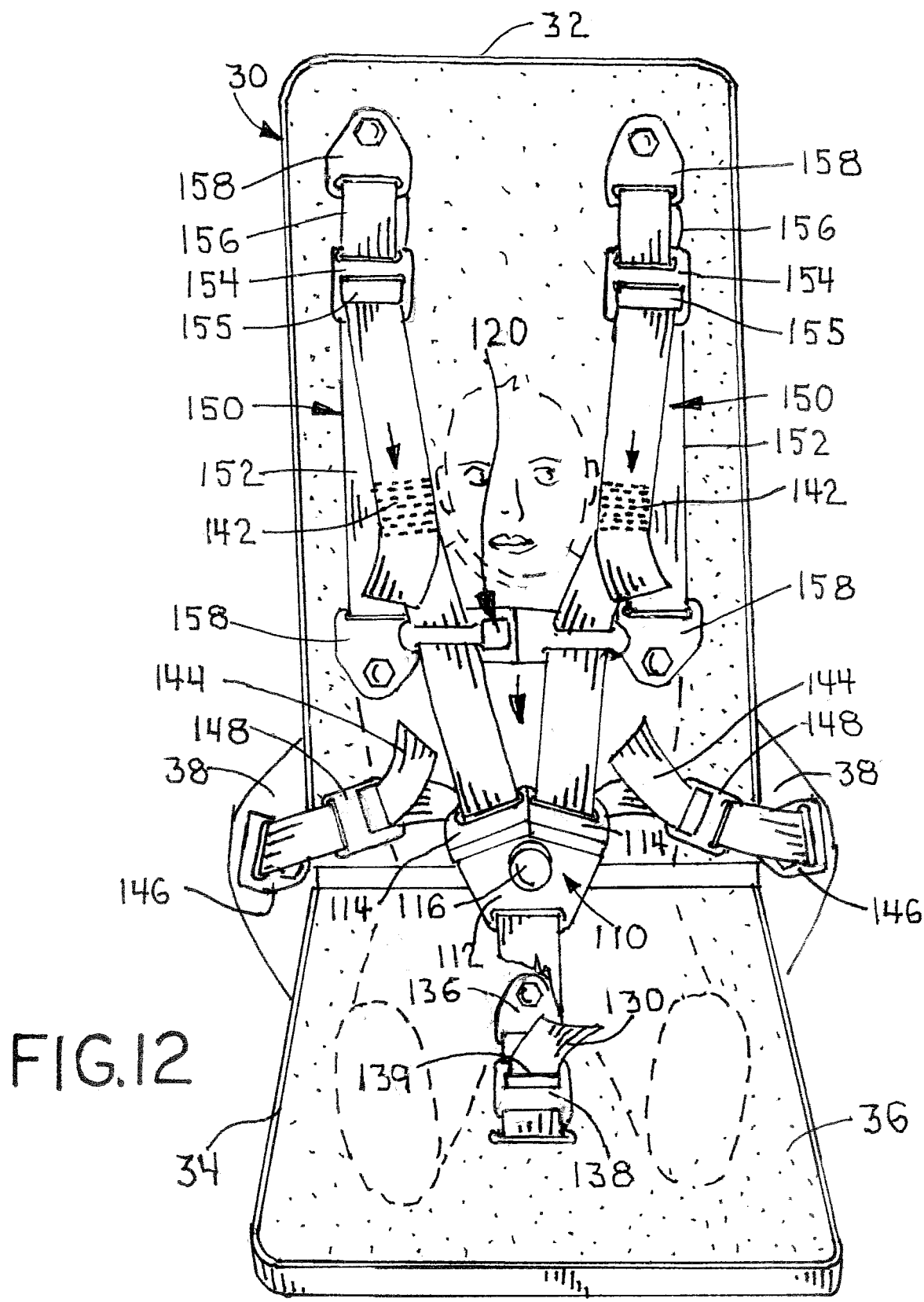
FIG. 12 is a front view of an infant seated on the child carrier and secured by the child restraint of FIG. 1.
Figure 13:
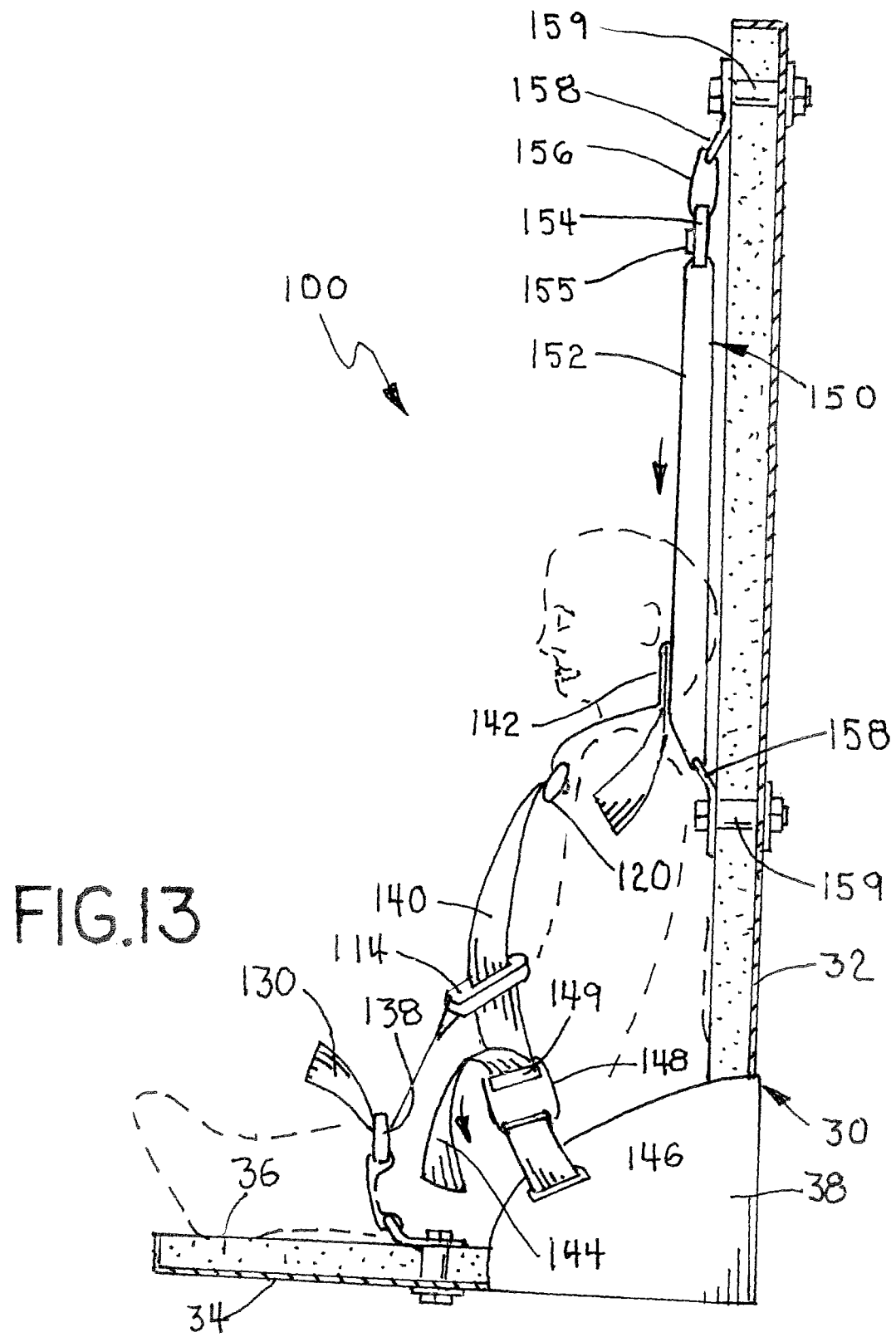
FIG. 13 is a side view of an infant seated on the child carrier and secured by the child restraint of FIG. 1.

FIGS. 8-13 illustrate the ability of child restraint 100 to selectively position the top of the shoulder strap over and behind the child using the shoulder location adjusters 150. As shown, child restraint 100 accommodates children of varying torso lengths such as toddlers (FIGS. 10 and 11) and young children and infants (FIGS. 12 and 13). As shown, the child's back rests partially over strap loops 152 and the child's arms extend under side straps 140. Once the child is seated on cradle/seat 30, shoulder ends 142 are manually positioned by holding release button 155 and sliding strap loops 152 up and down. For children with longer torsos, such as toddlers, shoulder ends 142 are moved upward along the length of strap loops 152. For children with shorter torsos, shoulder ends 142 are moved downward along the length of strap loops 152. Once shoulder ends 142 are properly positioned, center buckle 110 is interconnected and locking slides 138 and 148 are used to tighten crotch belt 130 and side straps 140 securing the child within cradle/seat 30.

It should be noted that the child restrain of this invention provides a more secure safety belting system than conventional restraints. The shoulder location adjusters allow for the proper positioning of the shoulder straps over and behind the child regardless of the length of the child's torso. Properly positioning the shoulder straps over and behind the child's shoulder more precisely fits and tightens the restraint around the child, thereby enhancing child safety. The use of locking slides on the shoulder location adjusters allows the child restraint to be readily adjusted and the child safely and securely placed and belted into the child carrier.

It should be apparent from the foregoing that an invention having significant advantages has been provided. While the invention is shown in only a few of its forms, it is not limited to, but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. In a child carrier having a seat panel and a back panel, a child restraint for securing a child within the child carrier, the child restraint comprising:
   a restraint harness including a shoulder strap adapted to extend across and over a shoulder of the child while seated within the carrier, the shoulder strap having a first shoulder strap end thereof; and
   a shoulder location adjuster mounted flat over the back panel, the shoulder location adjuster includes a first strap anchor mounted to the back panel, a second strap anchor mounted to the back panel and spaced apart from the first strap anchor and a strap loop slidably trained between the first strap anchor and the second strap anchor for reciprocal conveyer-like movement between the first strap anchor and the second strap anchor over the back panel,
   the first shoulder strap end attached to the strap loop at a fixed point along the strap loop to move with the strap loop over the back panel, thereby selectively positioning the first shoulder strap end relative to the back panel and child.

2. The child restraint of claim 1 wherein the first strap anchor includes a locking slide, the strap loop extending through and trained about the locking slide.

3. The child restraint of claim 2 wherein the locking slide includes a lock mechanism for selectively engaging the strap loop to prevent the sliding movement of the strap loop between the first strap anchor and the second strap anchor.

4. The child restraint of claim 1 wherein the strap loop lies flat against the back panel and interposed between the child and back panel when the child is seated within the child carrier.

5. The child restraint of claim 1 wherein the safety harness includes a lap strap connected to the seat panel and buckle connecting the shoulder strap and the lap strap.

6. The child restraint of claim 5 wherein the safety harness also includes a crotch strap connected to the seat panel, the buckle also connects the crotch strap to the shoulder strap and the lap strap.

7. The child restraint of claim 1 wherein the shoulder location adjuster also includes a loop restraint affixed to the strap loop for keeping the strap loop taut between the first strap anchor and the second strap anchor.

8. The child restraint of claim 7 wherein the loop restraint is a length of elastic webbing having opposed ends thereof sewn to the strap loop.

9. The child restraint of claim 8 wherein the loop restraint urges a section of the strap loop so that a collapsible gather in the strap loop forms between the opposed ends of the elastic webbing.

10. A child carrier comprising
    a seat panel;
    a back panel; and
    a child restraint for securing a child within the child carrier, the child restraint includes a restraint harness including a shoulder strap adapted to extend across and over a shoulder of the child while seated within the carrier, the shoulder strap having a first shoulder strap end thereof, and a shoulder location adjuster mounted flat over the back panel, the shoulder location adjuster includes a first strap anchor mounted to the back panel, a second strap anchor mounted to the back panel and spaced apart from the first strap anchor and a strap loop slidably trained between the first strap anchor and the second strap anchor for sliding reciprocal conveyer-like movement between the first strap anchor and the second strap anchor over the back panel,
    the first shoulder strap end attached to the strap loop at a fixed point along the strap loop to move with the strap loop over the back panel, thereby selectively positioning the first shoulder strap end relative to the back panel and child.

11. The child carrier of claim 10 wherein the first strap anchor includes a locking slide, the strap loop extending through and trained about the locking slide.

12. The child carrier of claim 11 wherein the locking slide includes a lock mechanism for selectively engaging the strap loop to prevent the sliding movement of the strap loop between the first strap anchor and the second strap anchor.

13. The child carrier of claim 10 wherein the strap loop lies flat against the back panel and interposed between the child and back panel when the child is seated within the child carrier.

14. The child carrier of claim 10 wherein the safety harness includes a lap strap connected to the seat panel and buckle connecting the shoulder strap and the lap strap.

15. The child carrier of claim 14 wherein the safety harness also includes a crotch strap connected to the seat panel, the buckle also connects the crotch strap to the shoulder strap and the lap strap.

16. The child carrier of claim 10 wherein the shoulder location adjuster also includes a loop restraint affixed to the strap loop for keeping the strap loop taut between the first strap anchor and the second strap anchor.

17. The child carrier of claim 16 wherein the loop restraint is a length of elastic webbing having opposed ends thereof sewn to the strap loop.

18. The child carrier of claim 17 wherein the loop restraint urges a section of the strap loop so that a collapsible gather in the strap loop forms between the opposed ends of the elastic webbing.

* * * * *